Nov. 24, 1925. 1,562,900
P. MAHIEU
CUPPING APPARATUS
Filed Nov. 3, 1921    2 Sheets-Sheet 1

Inventor:
Paul Mahieu
By H. W. Mack
Attorney

Nov. 24, 1925.                              1,562,900
P. MAHIEU
CUPPING APPARATUS
Filed Nov. 3, 1921        2 Sheets-Sheet 2

Inventor:
Paul Mahieu
By Hillack
Attorney

Patented Nov. 24, 1925.

1,562,900

UNITED STATES PATENT OFFICE.

PAUL MAHIEU, OF PARIS, FRANCE.

CUPPING APPARATUS.

Application filed November 3, 1921. Serial No. 512,470.

*To all whom it may concern:*

Be it known that PAUL MAHIEU, a citizen of the Republic of France, residing at 41 and 43 Rue d'Hautpoul, Paris, France, has invented certain new and useful Improvements in Cupping Apparatus, of which the following is a specification.

Cupping glasses or vessels ordinarily in use are subject to the inconvenience that they can only be applied by persons who are accustomed in their handling, because it is necessary to heat the air contained in them by means of a small torch usually in the form of a spirit lighter.

The present invention relates to improvements in dry cupping apparatus which provide that the rarification of the air is produced by means of a small pump entirely independent from the cupping glass and adapted to be applied and operated by anybody.

Figure 1:
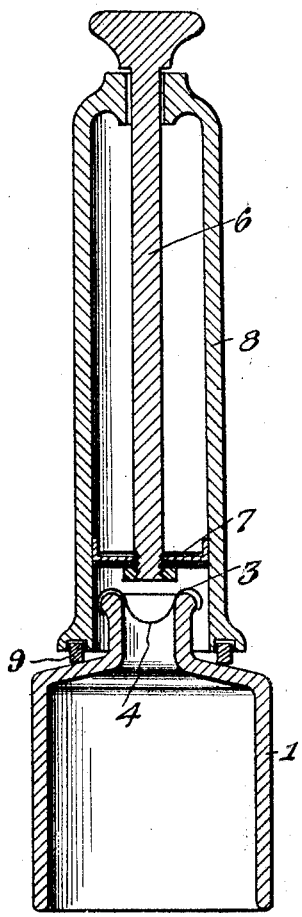
Figure 4:
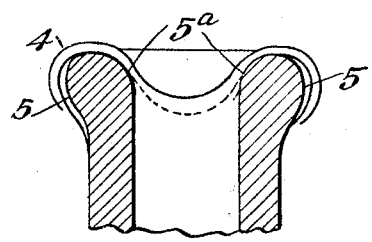
Figure 2:
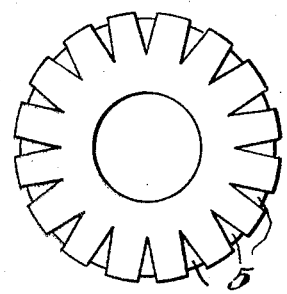
Figure 3:
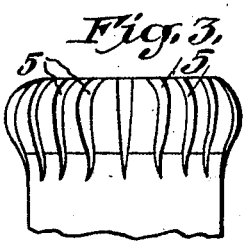
Figure 5:
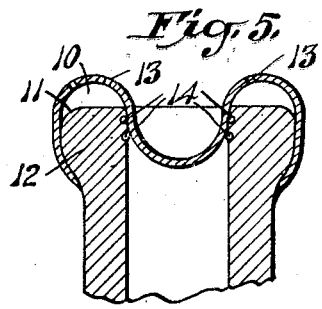
Figure 6:
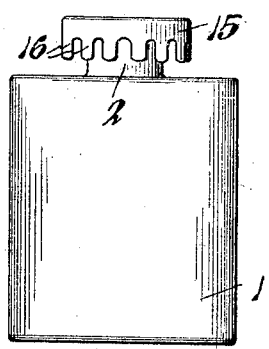
Figure 8:
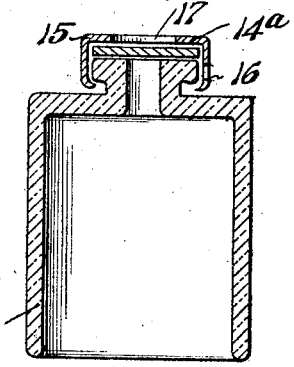
Figure 7:
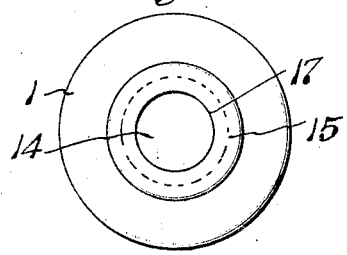
Figure 9:
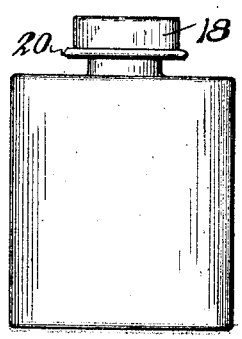
Figure 11:
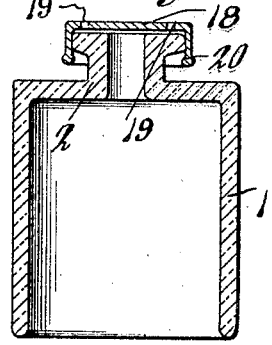
Figure 10:
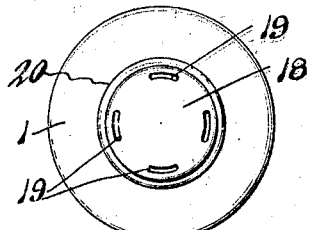

An embodiment of my invention is illustrated in the accompanying drawings in which Figure 1 is a longitudinal section of a cupping glass with the pump in position, Figure 2 is a plan view on an enlarged scale of the membrane on the rim of the neck of the glass, Figure 3 is a similarly enlarged view of the rim of the neck in elevation, Figure 4 being a vertical section through the neck and membrane. Figure 5 is a vertical section of a modified form of membrane. Figures 6, 7 and 8 show modified forms of neck and membrane covers in elevation, plan and vertical section respectively, while Figures 9, 10 and 11 are similar views of another modification.

Referring to Figures 1 to 5 the cupping glass comprises a cylindrical glass vessel 1 provided at its top with a tubular neck 2 upon which is placed a cap or membrane 3 of flexible rubber (or any other flexible and resisting material) which ensures an air-tight connection when the air in the vessel 1 has been rarified. This membrane which is of a larger diameter than the diameter of the tubular neck, forms a pocket 4 which becomes still more pronounced when the air below it is rarified. It then expands and presses strongly, both exteriorly and interiorly against the walls of the neck.

In order to enable the air in the cupping glass to be exhausted when the pump is operated, the annular rim of the neck is provided with flutings 5 as is shown on an enlarged scale in Figures 2, 3 and 4. These flutings extend slightly into the exterior surface of the tubular neck.

As will be readily understood the membrane does not close up these flutings. As soon as pumping of the air from the cupping glass is started, the air is evacuated by way of these flutings. The membrane thereupon expands in a gradually increasing measure under the pressure of the air which is above it, and when the vacuum is sufficient adheres to the interior circumference of the neck as shown at 5ª Fig. 4.

The flutings which are shown as grooves in the example illustrated might be formed by bosses or projections which produce the same effect. Likewise they might be provided,—for example by moulding,—in suitable positions on the inner face of the edge of the membrane.

Flutings might also be entirely dispensed with by applying the membrane to the smooth rim of the neck as shown on an enlarged scale in Fig. 5 where a small space 10 is left between it and the upper face 11 of the annular rim 12 of the vessel 1, small holes, such as 13, being provided in the said membrane, such holes being situated in the circular part which is immediately above the upper face 11 of the rim 12. With this arrangement, when the air is drawn from the cupping glass, such air passes at 14 between the inside wall of the neck and the membrane and then through the holes 13. When the vacuum is sufficient in the cupping glass and the pumping action is stopped the pressure of the air which acts from above on the membrane, presses it strongly at 14 against the inner circumference of the neck over a more or less extended zone.

The closing means for the vessel can also be formed as shown in Figures 6 to 8 or in Figures 9 to 11.

In the first case the closure is constituted by a strong, flexible disc 14ª of rubber or other suitable material.

This disc lies on the flat surface of the neck 2 of the cup 1 and is held in place by a metal cap 15 having on its periphery claws 16 which grip under the rim of the neck 2, this cap having a circular central opening 17.

In the second case the closure is constituted by a rubber or similar disc 18, in one piece and shaped to form a flat part with perforations 19 in its periphery, and a collar or flange 20 for securing the closure on the rim of the neck 2 of the vessel 1.

The air drawn up by the pump passes between the flat part of the rim and the disc 14$^a$ and through the central perforation 17 in the metal cap 15 in the first modification, and through the perforations 19 in the disc 18 in the second modification until the vacuum produced in the cup is sufficient to strongly apply the flexible discs against the rim of the neck 2 when the suction ceases. In both of the forms shown in Figures 8 and 11 the effect of the vacuum within the cup or vessel is to draw the disc 14$^a$ or 18 more or less into the open neck according to the thickness of the disc.

The vacuum is produced by means of a small pump the piston rod 6 of which carries a piston 7.

The lower end of the pump body 8 is provided with a flange which carries, in a groove, a rubber packing 9.

After placing the cupping glass in position, the pump, the piston of which had previously been moved to its lowest position, is placed on top of it, and pressed so as to ensure a tight joint between the packing 9 and the exterior of the cupping glass. On operating the pump the air is drawn through the flutings in the neck and passes out above the piston on its down stroke. The operation is repeated until the rarification of the air in the cupping glass is sufficient when the pump is removed, the atmospheric pressure on the outside of the membrane causing it to seal the open end of the vessel 1.

After the cupping glass has produced its effect it is sufficient to remove the membrane from the neck to destroy the vacuum.

I claim:—

1. In a cupping device, a cupping vessel open at the bottom and having an open neck at the top, a flexible membrane over the neck opening adapted to be drawn partly into the neck under the influence of exterior atmospheric pressure and means outside of the area of contact of the membrane with the inside of the neck for permitting escape of air during the process of exhaustion.

2. In apparatus of the character set forth in claim 1, a cap lying over the membrane and provided with claws engaging the rim of the neck.

In testimony whereof he affixes his signature.

PAUL MAHIEU.